June 13, 1967   R. A. BROWN   3,325,732
MAXIMUM DEMAND REGISTER USING CONSTANT SPEED
DRIVE FOR PERIODIC SUBTRACTIONS PROPORTIONAL
TO MOMENTARY READING OF DEMAND INDICATOR
Filed Feb. 26, 1964   2 Sheets-Sheet 1

INVENTOR.
Robert A. Brown
BY Darbo, Robertson &
Vandenburgh   Attys.

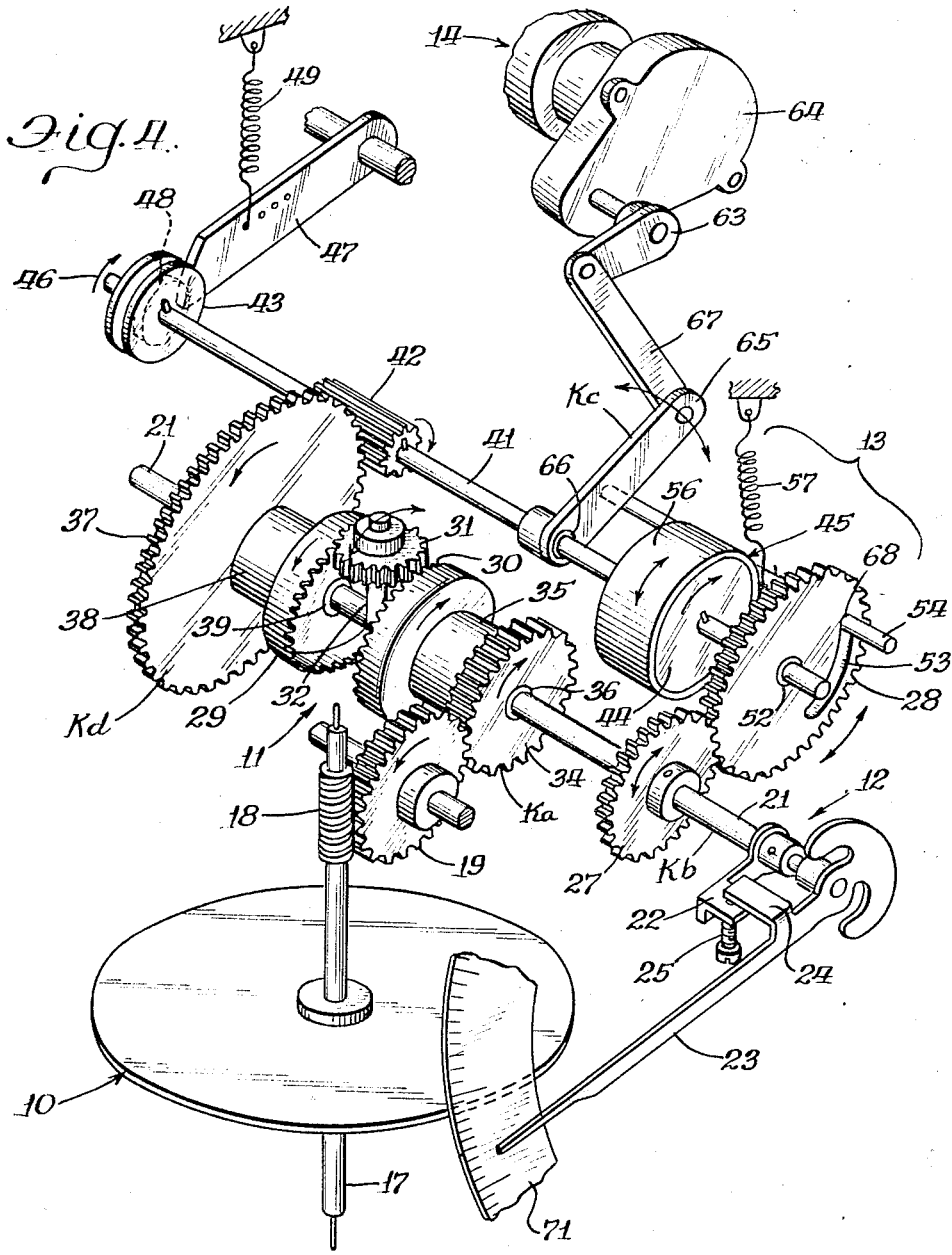
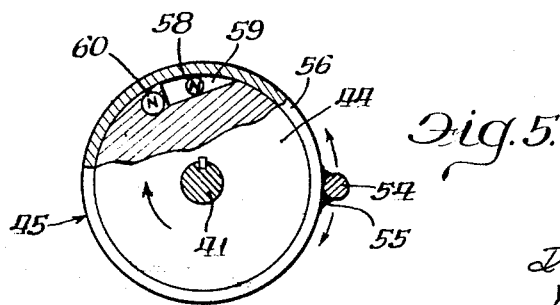

United States Patent Office 3,325,732
Patented June 13, 1967

3,325,732
MAXIMUM DEMAND REGISTER USING CONSTANT SPEED DRIVE FOR PERIODIC SUBTRACTIONS PROPORTIONAL TO MOMENTARY READING OF DEMAND INDICATOR
Robert A. Brown, Lafayette, Ind., assignor to Duncan Electric Company, Inc., Lafayette, Ind., a corporation of Indiana
Filed Feb. 26, 1964, Ser. No. 347,605
14 Claims. (Cl. 324—103)

The present invention relates to electric maximum-demand meters, and the following disclosure thereof is offered for public dissemination upon the grant of a patent therefor.

Public regulatory bodies commonly provide for the sellers of electric power to bill industrial establishments on the basis of two kinds of meter readings. One is in terms of kilowatt-hours as determined by the ordinary electricity meter similar to that with which every home ower is familiar. The other is in terms of maximum demand. Maximum-demand meters may be said, with some oversimplification, to show the maximum rate of use reached during the month, so that the facilities of the electricity distribution system which are required to supply that maximum demand can be an element of the billing. In other words, the industrial user is billed not only for the total energy he consumes but also for the amount of equipment which his maximum demand makes necessary.

In a sense, the ideal type of maximum-demand meter is the type known as the lagged demand meter. The term "lagged" referes to the fact that there is a built-in delay before the reading of the meter fully reflects the demand being measured. The industry has a specific theoretical requirement as to the amount of lag. This requirement is that when a steady load being measured by the meter is changed to a new level and remains steady at the new level, the meter reading shall change 90 percent of the distance toward that new level in a specified number of minutes. A common number of minutes is fifteen. One reason that lagged demand meters are ideal is that the lagged reading corresponds to a large degree to the curve of temperature rise in distribution equipment such as transformers. Thus, a lagged demand meter reflects more accurately the distribution equipment required than would a meter which in fifteen mintues would conform 100 percent to the new steady state load.

A commercially successful form of lagged demand meter has been the thermal demand meter.

The thermal demand meters, broadly speaking, operate on the principle that a temperature-responsive element such as a bimetal coil is heated by the electric current in proportion to the power being consumed by the load whose demand is being evaluated. Actually, there are two such elements, differentially heated by complex circuitry.

Thermal demand meters inherently require calibration, a troublesome operation. Such a meter must be accurate for its ultimate reading. Accuracy for its lagged (90%) reading, would be desired, though much deviation has been tolerated. Final calibration is best completed after actual installation in the field. Temperature compensation must be provided since the dissipation of heat, on which accuracy depends, will change with ambient temperature changes. Complex and expensive components are employed. A relatively large space is required.

In spite of the great advantage of lagged demand meters, the industry standard, or far more common, meter has for many years remained the block interval type of demand meter. Because this meter is provided merely by using a special type of meter register with the highly accurate watthour meter, and driven by its disk, it had various advantages. It was lower in cost, unvarying, did not need calibration and was easier to fit into the space available. Also, in a nominal sense, there seemed to be a greater assurance of high accuracy. This latter, however, was well recognized by true analysts within the industry to be highly fallacious due to a gross fault of the block interval demand meter in "splitting peaks." The block interval meter is automatically reset to zero at the end of each chosen demand measuring period, say fifteen minutes. If this resetting occurs anytime during the continuation of a short duration peak load, that peak load is split; and part of it is measured in one 15-minute period and the remainder is measured in the next 15-minute period. Hence, neither period reflects the full value of this peak load. It is possible, considering the extreme in one direction, that only half of the peak load will be measured. This would probably be below the second highest reading of the month and hence would not be at all reflected in the meter reading at the end of the month. This gross error tends to make futile various refinements which have been adopted for nominal accuracy. The extreme in the other direction is also undesirable, because that would be registering 100 percent of the peak increment, whereas the above-discussed advantages of lagged meters indicates that only 90 percent of the peak increment should be considered if it lasts only for one demand-measuring period.

There have been attempts to provide lagged demand meters of mechanical nature which would be free from the faults, inconveniences, and high cost of thermal demand meters. For example, Patents 2,331,241 and 2,323,-734 provided for using a differential gearing for merging two inputs into one output which provided the demand indication. One input would be driven by the watthour meter disk with the usual effect of driving the demand indicator up scale. The other input would be driven in the direction to have a subtracting effect, or to move the demand indicator down scale. However, the complex theory governing the design of meters of this type requires that the subtraction be proportional to the momentary reading of the demand indicator. This has presented problems not satisfactorily solved until the present invention. The prior proposals for solving this problem involved the use of a variable speed drive. The use of variable speed drives is quite disadvantageous in a precision measuring instrument. In addition to being expensive and space consuming, dependability of accuracy is difficult or impossible to achieve.

The present invention achieves the same results previously sought. Dependable accuracy is attained, partly because no variable speed drive is used. Subtractions at frequent intervals are used instead of continuous subtractions at various speeds. The amount of subtraction is still determined by the demand indication of the instant, but in a more direct and highly accurate manner. For example, the momentary demand indication may determine the length of movement through which a subtracting unit will be effective.

Embodiments of the present invention readily can be made to meet the industry requirements for lagged demand meters. They are quite simple and inexpensive to construct. They require no field calibration nor temperature compensation. Basic units can be constructed which are adaptable to the production of different models through minor changes in gearing. The embodiments can be made to readily fit existing watt-hour meters. The periodic subtractions are achieved without imposing a load on the watt-hour meter disk to drive the subtraction apparatus.

Further objects and advantages will become apparent from the following description taken in conjunction with the drawings in which:

FIGURE 4 is an isometric view of a somewhat diagrammatic representation of an embodiment of the invention; and FIGURE 5 is an elevation partly broken away of a portion of the subtraction mechanism employed in the embodiment of FIG. 4.

*General description*

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Figure 1:
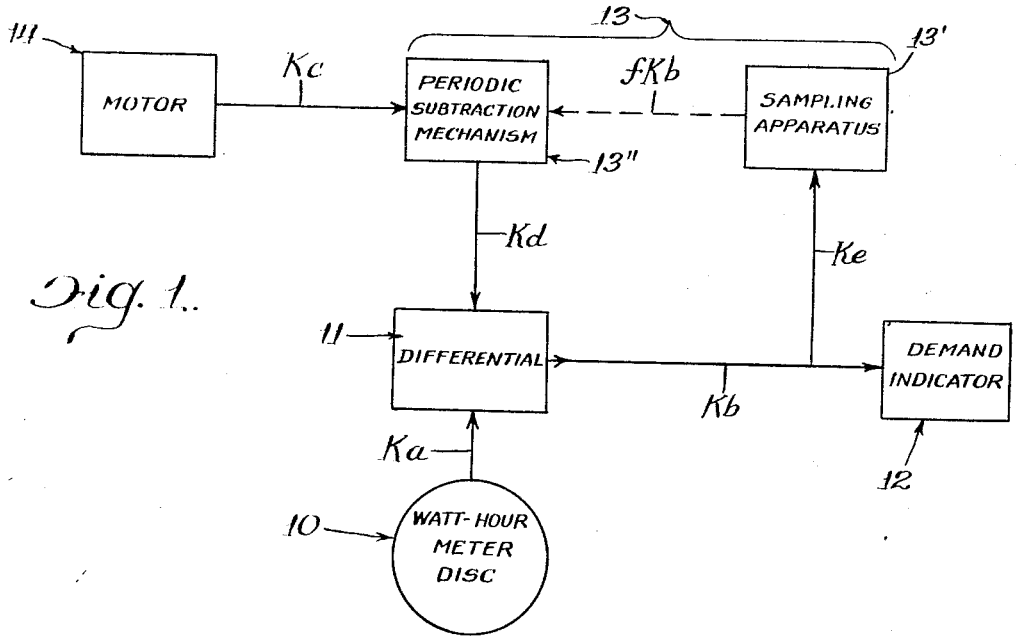
FIGURE 1 is a diagrammatic representation of the operation of the present invention.

Referring to FIG. 1 the watt-hour meter disk generally 10 provides an input drive $K_a$ (which could also be called a signal) proportional to the watt-hour demand of the load connected to the meter. This drive is fed to one input side of a differential generally 11. The output of the differential is a drive $K_b$ which represents the demand indication. The drive $K_b$ is delivered to a demand indicator generally 12 and also to a sampling or repeater apparatus 13′ of a combined periodic subtraction mechanism and sampling apparatus generally 13, of which the periodic subtraction mechanism is indicated as 13″. $K_e$ may be speed reduction gearing.

The sampling apparatus 13′ ascertains the angular position of drive $K_b$ and demand indicator 12 at any given time and passes that information on to the periodic subtraction mechanism 13″ as a signal $fK_b$ (function of $K_b$). The periodic subtraction mechanism is driven by a synchronous electric motor generally 14. This drive is indicated by the notation $K_c$. At regular intervals the periodic subtraction mechanism 13″ feeds a subtraction drive $K_d$ to the second input side of differential 11. Drive $K_d$ is derived from the synchronous motor drive $K_c$ but its amount is determined by the signal $fK_b$ obtained by the sampling apparatus 13′ from demand indicator 12 or drive $K_b$ (or differential 11 as you will).

The notation $K_d$ is the amount of subtraction that must be obtained in a given period to achieve the over-all result of meeting the industry standards (or whatever other requirement that may be determinative). In the most closely related prior art, this subtraction took place continuously with the rate being varied, by a variable speed drive, as a function of the demand indication. In the present invention, the over-all time is divided into a plurality of periods, with the length of each time period being chosen somewhat arbitrarily to achieve the desired result. Within each time period a subtraction is made (assuming that a demand indication is present) always at a constant rate, but with the proportion of the period devoted to subtraction being varied as a function of the demand indication. Thus, within each subtraction period there normally will be a subtraction time and a dead time during which no subtraction is made.

Figure 2:
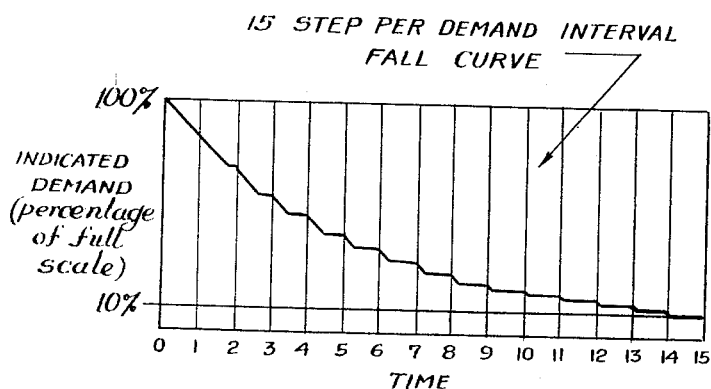
FIGURES 2 and 3 are charts illustrating the principle of operation in arriving at demand indications.

FIGURE 2 illustrates the operation of the invention under the conditions where there has been a full load demand for a sufficient time so that the demand indicator 12 reads at full scale, shown as 100% in FIG. 2. The illustration then assumes that at time 0 the demand was completely discontinued. Also, for ease of illustration, one minute has been chosen as the "period"; i.e., the apparatus will produce one subtraction a minute through the differential. For simplification, it is assumed that the highest possible subtraction would consume the full minute.

For the first minute following time 0, the subtraction apparatus operates continuously to supply drive $K_d$ for the full minute period to subtract from the previous existing $K_b$ an amount that is a required proportion of the signal $K_b$ existing at the start of the first minute. During the second minute the subtraction mechanism 13″ operates for only that portion of the minute required to subtract through differential 11, a new amount that is the same proportion of the $K_b$ indication at the start of the second minute. This subtraction is shown in the first part of the second minute, the subtraction mechanism then being idle (dead time), and feeds no signal to differential 11 for the rest of the minute. During each successive minute the subtraction mechanism 13″ operates for an increasingly shortened length of time with a corresponding increase in the dead time for each period, so that the actual amount subtracted through differential 11 continues to decrease. At the end of fifteen minutes the total amount subtracted will be 90% of the demand indication at the start of the fifteen-minute period, the "proportion" having been chosen to give this result. This will meet the industry requirements.

Figure 3:
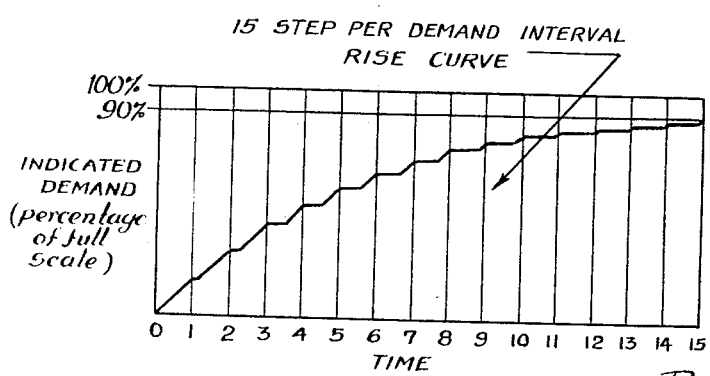

FIGURE 3 illustrates the operation in the situation when at the start of the fifteen-minute period there was no demand indicated by indicator 12 (i.e. $K_b$ was 0). At time 0 a full load demand was turned on (i.e. $K_a$=full load) and continued for a fifteen-minute period. During the first minute no subtraction occurred since $K_b$ was 0 at the start of the minute. Therefore, the indicated demand rose rapidly and evenly. At the start of the second minute subtraction mechanism 13″ commenced operating to subtract through differential 11 an amount that was the same assumed proportion of the $K_b$ indicated at the start of the second minute. Under the assumed conditions, the rate of subtraction through differential 11 would be equal to the rate of input to the differential from watt-hour meter disk 10, so that the line of the graph remains horizontal for the first part of the second minute. During the latter portion of the second minute the periodic subtraction mechanism 13″ was inactive so that the only input to the differential 11 was that provided by meter disk 10. The graph thereupon steps upwardly to the end of the second minute. As the graph moves upwardly, a greater and greater amount is subtracted in each minute and thus, the periodic subtraction mechanism 13″ feeds a signal to differential 11 for an increasingly greater portion of the minute. This is seen on the graph by the increasing length of the horizontal lines within each successive minute. At the end of fifteen minutes the reading at the demand indicator ($K_b$) is 90% of the steady state condition that was applied commencing at time 0. This again satisfies the industry requirements.

Of course, when during a fifteen-minute period there is at least one variation in the load being measured, the graph would be much more complex than either FIGURES 2 or 3, but the same principles will apply. At the start of any period a sampling is made by sampling apparatus 13′ of the then existing indicator reading, (the magnitude of $K_b$). The sampling apparatus 13′ directs the operation of the periodic subtraction mechanism 13″ so that it operates for a period of time that is the assumed proportion of the then indicated demand. The greater the demand indication at the start of the period, the longer will be the operation of the subtraction mechanism 13″, and thus, the greater the actual amount subtracted during the minute. The smaller the demand indication at the start of the period, the shorter will be the time of operation of the periodic subtraction mechanism 13″, and thus, the smaller will be the actual amount subtracted during the minute.

To facilitate illustration, FIGURES 2 and 3 have represented each period as being one minute. It will be apparent that the shorter the periods, the more accurate will be the instrument. In actual operation a device will be constructed which will operate with periods more nearly approximating ten or fifteen seconds rather than one minute, the "proportion" being correspondingly reduced to give the 90% result at the end of the chosen time, commonly fifteen minutes. However, if it would be desired to simulate a fifteen-minute block interval demand meter, for example, the time per subtraction would be fifteen minutes and at the end of each fifteen-minute period a subtraction would begin which would continue until all of $K_b$, as it had stood at the end of said period, had been subtracted.

In the foregoing discussion of the invention, an example was given in which the length of the period coincided with the maximum subtraction time. This is not necessary. Embodiments can be made in which the subtraction, even at maximum demand levels, takes place for only a fraction of the preselected period. Thus, necessarily there will be "dead" time, in which the no subtraction occurs, even at the maximum demand levels. In some respects these are advantageous since there is a necessary "gaiting" or "pacing" of the operation. One such embodiment will be discussed in connection with FIGURE 4.

Each time that a subtraction drive is fed to differential 11, the rate of subtraction during the period of the drive is constant. The power for that drive, of course, is supplied by motor 14. Within the preselected periods, the length of the subtraction operation will be relatively long when $K_b$, representing the position of indication of the demand indicator 12, is high. Conversely, the length of the subtraction time, as related to the total length of the period, is relatively short when the demand indication $K_b$ is small. Thus, sampling apparatus 13' ascertains the relative magnitude of the demand indication $K_b$ and directs the operation of the periodic subtraction mechanism 13" as to the length of time within the period that it should operate to subtract the required "proportion" of demand indication.

The signal line between the sampling apparatus 13' and the periodic subtraction mechanism 13" in FIGURE 1 is dotted to indicate that the periodic subtraction mechanism is not driven from the meter disk through the differential. The power required for the subtraction is obtained solely from motor 14. The sampling apparatus 13' merely directs the length of the application of the power from periodic subtraction mechanism 13" to differential 11 during the preselected period. Within the preselected period the subtraction may occur at the start of the period as described above in conjunction with FIGURES 2 and 3. Alternatively, the subtraction may always terminate at the end of the period as described in conjunction with the specific embodiment of FIGURE 4. Except in the case of simulating a Block Interval which requires the first alternative, the choice is a matter of machine design and does not materially affect the use of the invention.

*Specific embodiment*

In FIGURE 4 the shaft 17 of the meter disk 10 is shown coupled to the apparatus through a worm gear 18 and a spur gear 19. This is merely a simplified illustration. In actual practice several intermediate elements would likely be employed to facilitate ease of installation and removability, range alteration, a drive take-off leading to a conventional kilowatt hour register, etc. It will be apparent to those skilled in the art that some of the remaining elements have also been illustrated in simplified form.

Demand indicator 12 comprises a shaft 21 and an arm 22 coupled thereto. A maximum demand indicating pointer 23 is journaled on shaft 21. Pointer 23 has an arm 24 to provide contact with a zero adjusting screw 25 of arm or pusher 22. As shaft 21 and arm 22 are turned clockwise, they in turn move pointer 23 clockwise. The pointer is provided with conventional means, not shown, to hold it in whatever position it is pushed to. Thus, at the end of a meter-reading period, such as a month, it will indicate the maximum demand that occurred during the meter-reading period. At the end of the reading period, after the reading is taken, pointer 23 is manually reset to its zero position, or to engagement with pusher 22 in its then position.

It should be observed that pusher 22 (or even the shaft 21) can be considered a demand indicator or indicating device for the purpose of prior discussion, or claiming, in that the angular position thereof indicates the demand currently measured, whether or not the intelligence of this indication is observable. It happens to be readily observable at the time it is pushing pointer 23, but it is to be deemed an indicator even when that is not the case.

A gear 27 is secured to shaft 21 and drives sampling gear 28. The differential 11 comprises two input gears 29 and 30 and a planetary gear 31. Planetary gear 31 is journaled on a stub shaft 32 which extends as an arm from shaft 21. As stub shaft 32 swings, it turns indicator shaft 21, hence these, with planetary gear 31, form the output member of the differential. Input gear 30 and a gear 34 are secured to a common hub 35 having a bearing 36 journaled on shaft 21. Similarly, input gear 29 and a gear 37 are secured to a common hub 38 journaled on shaft 21 by means of bearing 39. The bearing, in each instance may be the inner portion of the hub.

The combined subtraction and sampling apparatus 13 incldues a shaft 41 to which is secured a pinion 42, a wheel 43 and the central or driven portion 44 of a one-way drive unit generally 45. Wheel 43 is a part of a conventional counter rotation brake or stop to permit shaft 41 to rotate only in the direction indicated by arrow 46. A spring loaded pivotal member 47 has a nose engaging a base 48 of a groove in wheel 43. The nose of pivotal member 47 bears against the base 48 and is urged against the base by a spring 49, in such manner that as shaft 41 is rotated in the direction indicated by arrow 46, member 47 can swing downwardly to free wheel 43 for movement. However, contact between member 47 and wheel 43 prevents even the slightest rotation in the direction reverse to that indicated by arrow 46.

Sampling gear 28 is journaled on shaft 41 by means of bearing 52. It includes an arcuate slot 53 through which extends a drive rod 54. Referring to FIGURE 5 it will be seen that drive rod 54 is welded or brazed as at 55 to the surface of the drive member or annulus 56 of one-way drive unit 45. Rod 54 moves up and down as hereinafter described, oscillating within slot 53 in sampling gear 28. Rod 54 is urged upwardly by a spring 57 and is forced downwardly against the urging of the spring by means of a crank mechanism operated by motor 14.

One-way drive mechanism 45 incorporates a one-way clutch so that despite the movement of annulus 56 in both a clockwise and in a counterclockwise direction, the central or driven portion 44 thereof only will rotate clockwise as viewed in FIGURE 4. The one-way clutch, for example, may be a plurality of rollers 58, each of which is received in a tapered groove 59 in central portion 44. Each roller is biased outwardly along the more tangential surface of groove 59 to the point at which it contacts both central portion 44 and annulus 56. It is greatly preferred that the biasing be magnetic, the roller 58 being permanently magnetized and being repelled by magnet 60. Preferably there are at least four rollers 58, each in separate grooves 59. At least three being desirable to guard against eccentricity and approximately diametric positioning also being advantageous. As annulus 56 is rotated clockwise, the rollers are wedged between the annulus and central portion 44 to rotate the central portion 44 to a corresponding extent. However, upon the counterclockwise rotation of annulus 56 the rollers yield to release the engagement and permit the counterclockwise rotation of the annulus 56 even though the central portion 44 remains stationary. Various forms of over-running or one-way clutches are well known.

The one employed should release readily, but upon coming to rest should reliably engage with the annulus 56 so that upon rotation of annulus 56 in the drive direction there will be no slippage between it and driven member 44.

Motor 14 drives a crank 63 through a speed reduction gear box 64. A second crank 65 is journaled on shaft 41 by means of bearing 66. A link 67 is pivotally connected to both cranks. The arrangement is such that as crank 63 rotates, crank 65 is moved up and down in a relatively short arc about shaft 41. As crank 65 moves downwardly, it contacts drive rod 54 to force the rod downwardly against the urging of spring 57. When crank 65 moves upwardly, it permits rod 54 to rise in response to the urging of spring 57. Thus, annulus 56, because of its engagement with rod 54 through shoe 55, oscillates back and forth in a clockwise and counterclockwise direction. The clockwise rotation of annulus 56 is translated into a corresponding rotation of shaft 41. Shaft 41 remains stationary as annulus 56 rotates in a counterclockwise direction.

The limit of the downward movement of crank 65, and thus of rod 54, defines one point (referred to as a fixed stop) in the cyclical extent of the movement of rod 54. The other limit of the cyclical movement of rod 54 is formed by an adjustable stop. In the illustrated embodiment, this adjustable stop is defined by closed end 68 of slot 53. In other words when rod 54 is raised to an extent such that it engages end 68 of slot 53 the rod will move upwardly no further despite the urging of spring 57 and despite the fact that crank 65 continues to move upwardly, in a counterclockwise direction, and away from rod 54. Thus, by changing the angular position of end 68 of slot 53 about the axis of shaft 41, one may change the length of stroke of rod 54 and thus, the extent to which shaft 41 is rotated upon the downward movement of the rod. This adjustment, of course, is achieved by the rotation of sampling gear 28 by gear 27.

When the gear 28 is positioned to prevent any upward movement of rod 54, the screw 25 on demand indicator 22 is adjusted to zero on scale 71, i.e., so that pointer 23, if against screw 25, will read zero. Once this adjustment has been made, the position of the upper end 68 will always reflect the scale position of indicator shaft 21 and pusher 22. When these are at the zero position, end 68 holds the rod 54 immobile at such position that the rod 54 is just touched by, but not moved by, crank 65 at the downward end of its stroke. Thus, rod 54 stands still despite the oscillation of crank 65 when the demand indication is "0."

Assuming that the demand indicator 12 is at zero and a steady demand is called for by the load connected to the watt-hour meter, this steady demand rotates meter disk 10 at a predetermined rate of speed related to the magnitude of the demand. The rotation of the meter disk is translated into a corresponding clockwise rotation of forward-driving gear 30 of differential 11. So long as subtraction-driving gear 29 remains stationary, the rotation of driving gear 30 moves stub shaft 32 in a clockwise direction about the axis of shaft 21. This results in a corresponding clockwise rotation of shaft 21, which is an upscale input of demand indicator 12.

The clockwise rotation of shaft 21 dictates a counterclockwise rotation of sampling gear 28. The counterclockwise rotation of sampling gear 28 moves the adjustable stop away from the fixed stop, i.e. moves end 68 of slot 53 upwardly. Now spring 57 can raise bar 54 away from the downward terminus of its movement, as crank 65 backs away. The extent to which the adjustable stop is moved away from the fixed stop is proportional to the demand indication as seen by the demand indicator 12 (or pusher 22). Some time after the start of the next downward movement of crank 65, the crank now will contact rod 54 to move it downwardly away from the adjustable stop defined by end 68 and to the fixed stop position, defined by the limit of downward movement of the crank. This movement of rod 54 is translated, through one-way drive unit 45, into a rotation of shaft 41 of a corresponding angular magnitude. Clockwise rotation of shaft 41 and gear 42 produces a counterclockwise rotation of gear 37 and thus of subtracting input member 29 of differential 11. If at this time forward input member 30 is stationary, the counterclockwise rotation of input member 29 moves stub shaft 32 in a counterclockwise direction. This causes a counterclockwise, down scale, rotation of shaft 21 and thus a subtraction proportional to the demand reading of indicator 12.

It will be seen that the magnitude of the $K_b$ from the differential 11 to the demand indicator 12 through shaft 21 is translated into an angular displacement of comparable magnitude of the adjustable stop, defined by end 68 of slot 53, from the fixed stop position, the limit of downward movement of rod 54 by the action of crank 65. A relatively great displacement of the adjustable stop from the fixed stop position will cause a correspondingly relative large rotation of shaft 41 and a proportionate subtraction through differential 11. Conversely, a relatively small angular displacement of shaft 21 results in a relatively small displacement of the adjustable stop from the position of the fixed stop, and the movement of rod 54 is correspondingly small. This results in a small subtraction through shaft 41 and input member 29 of differential 11.

The length of the periods is determined by the time it takes for crank 65 to complete one up and down oscillation. During the initial portion of the down stroke, no subtraction occurs, at least, not unless the demand indication is at full scale. Subtraction occurs during the terminal portion of the down stroke commencing with the instant at which crank 65 contacts rod 54 in a downward movement to carry rod 54 downwardly to the fixed stop. The amount of subtraction that occurs is dictated by the position of sampling gear 28 at the instant of initial contact between crank 65 and rod 54. Rod 54 always moves at the same speed cycle so that the subtraction alway occurs at the same corresponding program speeds. For example, the last 20 degrees always requires the same time lapse. Accordingly, the total amount of subtraction is in a sense determined by the length of time of subtracting movement of rod 54. During return movement of crank 65 it "gaits" the upward movement of rod 54, so that this rod does not snap against adjustable stop 68.

It will be apparent that similar apparatus can be constructed in which the fixed stop is positioned at the start of a period so that subtraction commences immediately, with the adjustable stop following thereafter to determine the end of the subtraction time rather than the beginning, as in the embodiment of FIGURE 4. In some embodiments maximum pointer 23 may be replaced by some other form of maximum indicating device such a plurality of dials designed to display the maximum reading.

*Design of gear ratios*

Specific embodiments of the meter embodying the present invention can be designed according to prior practice in some respects, such as choice of a gear ratio for forward drive $K_a$. This, of course, should be chosen to give the desired range and rate of movement of the maximum demand pointer along the scale 71. The effect of the differential in reducing the forward input by one-half should not be overlooked.

The number of subtractions per minute, or per demand period, may be chosen somewhat arbitrarily. Four per minute, or sixty per 15-minute demand period represents a present preference as a practical choice for a high quality meter which closely follows the theoretical curve. But, as FIGS. 2 and 3 show, even a frequency of subtraction of one a minute would provide very good characteristics. In fact, its deviations are far less than in meters previously available.

The gear ratios relating to subtractions must supply at $K_d$ twice the amount of drive for each step of subtraction as it is desired to subtract, because the nature of a differential is to reduce its drive from one side by one-half. Accordingly, if we let S be the coefficient of subtraction per step., i.e., the correct proportion of the indication at the moment represented by $K_b$, the gear ratio between $K_b$ and the differential input $K_b$ must equal 2S. For determining the value of S, applicant has developed the equation:

$$S = 1 - 10^{-1/N}$$

where N is the number of steps per demand period and therefore the number of steps in which the meter under a new steady load should change 90 percent of the way toward a correct indication.

For a demand meter subtracting 60 times in the demand period N becomes 60 and by solving the equation, S=.0377. Accordingly, the substraction gear ratio, 2S, should equal .0754. A gear ratio of .075 is entirely satisfactory, however, providing a much more accurate lagged value than was previously available. The .075 ratio can conveniently be provided by providing a ratio of 3/10 at $K_e$ and a ratio of 1/4 at $K_d$, unity (not gearing) being assumed at $fK_b$. The product of the ratios provides the specified .075 ratio. Thus, referring to FIG. 1, if the gears 27 and 28 should have the ratio of 3 to 10, then gears 42 and 37 would have the ratio of 1 to 4.

A meter of this design has been tested and found to follow accurately the theoretical curve. A scale length of ⅝ revolution, and a radius (demand pointer length) of about three inches permitted adequately accurate read-off of the accuracy thus provided. The forward input to the differential was 10/9 R.P.M. with the power being measured equaling maximum scale reading. The total effect is therefore more dependable accuracy of read-off as compared to the true value of maximum demand according to the correct theory than has previously been available. This is obtained at a moderate cost of manufacture and without need for calibration, or danger of loss of accuracy.

I claim:

1. A demand meter apparatus for use with a watt-hour meter having a rotatable meter disk, said apparatus including: a differential comprising two driving members engaging a driven member; means to drive one driving member in response to rotation of the meter disk; an indicator device coupled to said driven member to be moved upscale as said driven member is driven by said one driving member; and a subtracting device including a part movable along a path, means connected to said part and to said driven member to periodically move said part along said path in a given direction a distance which is proportional to the position of the driven member and including power means to drive said part said distance without imposing any load on said disk, and means connecting said part to said other driving member to move the driven member downscale an amount corresponding to the distance said part is moved in said given direction.

2. A demand meter apparatus for use with a source of electric power and with a watt-hour meter having a rotatable meter disk, said apparatus including: a differential comprising two driving members engaging a driven member; means to drive one driving member in response to rotation of the meter disk; an indicator device coupled to said driven member to be moved upscale as said driven member is driven by said one driving member; and a subtracting device including a part movable along a path, electric power means connected to said source and operatively engaging said part to move said part from a pickup point to a release point along said path in a given direction and to release said part at said release point, means connected to said part to return said part from said release point in the reverse of said direction, stop means movable along said path and connected to said driven member to be positioned in the reverse of said direction from said release point at a distance from the release point that is proportional to the position of the driven member and to intercept said part moving in the reverse of said direction to define the pickup point for said power means to engage the part for the start of the next movement of the part in said direction whereby the power means will periodically move the part from the pickup point to the release point through a distance that is proportional to the position of the pickup point in relation to the release point, and means connecting said part to said other driving member to move the driven member downscale an amount that is a proportion of the distance said part is moved in said given direction.

3. A demand meter apparatus for use with a source of electric power and with a watt-hour meter having a rotatable meter disk, said apparatus including: a differential comprising two driving members engaging a driven member; means to drive one driving member in response to rotation of the meter disk; an indicator device coupled to said driven member to be moved upscale as said driven member is driven by said one driving member; and a subtracting device including a part movable along a path about an axis between a pickup point and a release point, stop means movable along said path and connected to the driven member to be positioned along said path at an angular position that is proportionally related to the position of the driven member, said position of the stop means defining one of said points, electric power means connected to said source and operatively engaging said part at said pickup point and moving said part to said release point, said power means being operative to define the other of said points at a fixed angular position about said axis, means operatively engaging said part to return said part from said release point to said pickup point, and means connecting said part to said other driving member to move the driven member downscale in response to the movement of said part from one of said points to the other of said points an amount that is a proportion of the angular distance between the points.

4. A demand meter apparatus for use with a watt-hour meter having a rotatable meter disk, said apparatus including: a differential comprising two driving members engaging a driven member; means to drive one driving member in response to rotation of the meter disk; an indicator device coupled to said driven member to be moved upscale as said driven member is driven by said one driving member; and a subtracting device including a second shaft rotatable about an axis, means including a part movable in a path about said axis and a one-way clutch connecting the part and shaft to move the shaft in response to movement of the part in one direction only about the shaft, power driven means operatively engaging said part at a pickup point to move said part along said path to a release point having a fixed angular position about said axis and to release said part at said release point, stop means movable along said path to be positioned at a variable angular position in relation to the release point to define said pickup point, said stop means being connected to said driven member to position the pickup point an angular distance from the release point which is a proportion of the position of the driven member, means operatively engaging the part to return the part from the release point to the pickup point, and means connecting said second shaft to the other driven member to move the driven member downscale an amount that is proportional to the rotation of said second shaft.

5. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: an electric motor, and means operatively engaging the motor, the output shaft and the third element to periodically operate the third element to drive the shaft downscale by an amount that is a proportion of the upscale position of the shaft at the start of the operation of the third element.

6. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: an electric motor, and means operatively engaging the motor, the output shaft and the third element to periodically operate the third element to drive the shaft downscale by an amount that is a proportion of the upscale position of the shaft at the start of the operation of the third element, with a speed substantially independent of the upscale position of the shaft.

7. A demand meter apparatus for use with a watthour meter having a rotatable disk, said apparatus including: a differential comprising a driven member and advancing and subtracting members driving the driven member; means to drive the advancing member in response to rotation of the meter disk; an indicator device coupled to said driven member to be advanced as said driven member is advanced; a precise backlash-free one-way clutch having a drive member and a driven member, the driven member of said clutch being connected to drive said subtracting member and the direction of drive being such as to move the indicator device downscale; and means periodically oscillating the drive member of said clutch always to a zero position in one direction and in the other direction to a terminus determined on each movement by the then position of the indicator device, whereby during the successive oscillation periods the subtracting member is driven through an angle always in the same proportion to the then advancement of the indicator device, said periodic oscillating means having a period of not more than about one minute to provide a multiplicity of oscillations during a number of minutes conventional for a demand interval, and a maximum-demand device advanced by the indicator device to the point of its greatest advance and remaining at that point until by special intervention it is reset to be at least as low as the then position of the indicator device.

8. A demand meter apparatus for use with a watthour meter having a rotatable disk, and apparatus including: a differential comprising a driven member and advancing and subtracting members driving the driven member; means to drive the advancing member in response to rotation of the meter disk; an indicator device coupled to said driven member to be advanced as said driven member is advanced; a precise backlash-free one-way clutch having a drive member and a driven member, the driven member of said clutch being connected to drive said subtracting member and the direction of drive being such as to move the indicator device downscale; and means periodically oscillating the drive member of said clutch always to a zero position in one direction and in the other direction to a terminus determined on each movement by the then position of the indicator device, whereby during the successive oscillation periods the subtracting member is driven through an angle always in the same proportion to the then advancement of the indicator device, said periodic oscillating means having a period of not more than about one minute to provide a multiplicity of oscillations during a number of minutes conventional for a demand interval.

9. A demand meter apparatus for use with a watthour meter having a rotatable disk, said apparatus including: a differential comprising a driven member and advancing and subtracting members driving the driven member; means to drive the advancing member in response to rotation of the meter disk; an indicator device coupled to said driven member to be advanced as said driven member is advanced; a precise backlash-free one-way clutch having a drive member and a driven member, the driven member of said clutch being connected to drive said subtracting member and the direction of drive being such as to move the indicator device downscale; and means periodically oscillating the drive member of said clutch always to a zero position in one direction and in the other direction to a terminus determined on each movement by the then position of the indicator device, whereby during the successive oscillation periods the subtracting member is driven through an angle always in the same proportion to the then advancement of the indicator device.

10. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: an electric motor, and means operatively engaging the motor, the output shaft and the third element to periodically operate the third element to drive the shaft downscale by an amount that is a proportion of the upscale displacement of the shaft from a zero position at a time during the operation of the third element; said proportion having the value of 2S, with S being determined by the equation $S = 1 - 10^{-1/N}$, N being the number of operations of the third element in a demand period in which 90 percent movement of the shaft toward its ultimate position with a new steady load condition is desired.

11. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: an electric motor, and means operatively engaging the motor, the output shaft and the third element to periodically operate the third element to drive the shaft downscale by an amount that is a proportion of the upscale displacement of the shaft from a zero position at a time during the operation of the third element.

12. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: subtraction means for driving the third element in separate movements periodically at a given frequency with all movements at the same speed program and each movement proportional in extent to the then upscale displacement of the shaft.

13. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: subtraction means for driving the third element in separate movements periodically at a given frequency with all movements at the same speed program and each movement proportional in extent to the then upscale displacement of the shaft; said subtraction means including a cycling means, geared coupling means controlled by the cycling means to drive the third element, and limit means responsive to the shaft upscale displacement for determining the portion of the cycling movement during which the drive of the third element is effective.

14. In a demand register for use on a meter having a measuring element rotated in accordance with a variable measured quantity, said register being of the type having an output shaft coupled to one element of a differential to be driven upscale by the operation of a second element of the differential in response to the rotation of the measuring element and driven downscale in response to the operation of a third element of the differential, the improvement comprising: subtraction means for driving the third element in separate movements periodically at a given frequency with all movements at the same speed program and each movement proportional in extent to the then upscale displacement of the shaft; said subtraction means including a cycling means, geared coupling means controlled by the cycling means to drive the third element, and limit means responsive to the shaft upscale displacement for determining the portion of the cycling movement during which the drive of the third element is effective, the limit means being geared to the shaft with ratio A and the geared coupling means having ratio B, and the product of A times B equalling two times $(1-10^{1/N})$, N being the number of said movements in a chosen demand period during which movement of the shaft 90 percent of the way to its ultimate position with a new steady load condition is desired.

No references cited.

WALTER L. CARLSON, *Primary Examiner.*

R. V. ROLINEC, J. J. MULROONEY,
*Assistant Examiners.*